United States Patent [19]
Hanawa et al.

[11] Patent Number: 4,942,521
[45] Date of Patent: Jul. 17, 1990

[54] MICROPROCESSOR WITH A CACHE MEMORY IN WHICH VALIDITY FLAGS FOR FIRST AND SECOND DATA AREAS ARE SIMULTANEOUSLY READABLE

[75] Inventors: Makoto Hanawa, Kokubunji; Atsushi Hasegawa, Koganei; Tadahiko Nishimukai, Sagamihara, all of Japan

[73] Assignees: Hitachi, Ltd.; Hitachi Microcomputer Engineering Ltd., both of Tokyo, Japan

[21] Appl. No.: 119,919

[22] Filed: Nov. 13, 1987

[30] Foreign Application Priority Data

Nov. 14, 1986 [JP] Japan ................... 61-271235

[51] Int. Cl.⁵ .................. G06F 12/02; G06F 9/30; G06F 13/00
[52] U.S. Cl. .................. 364/200; 364/243.41; 364/243.4; 364/964.2
[58] Field of Search ... 364/200 MS File, 900 MS File

[56] References Cited
U.S. PATENT DOCUMENTS 4,363,095 12/1982 Woods et al. ............... 364/200
4,424,561 1/1984 Stanley et al. .............. 364/200
4,445,172 4/1984 Peters et al. ................ 364/200
4,586,130 4/1986 Butts, Jr. et al. ............ 364/200
4,602,368 7/1986 Circello et al. ............. 371/21
4,670,839 6/1987 Pilat et al. .................. 364/200
4,724,518 2/1989 Steps ......................... 364/200
4,811,209 3/1989 Rubinstein .................. 364/200

Primary Examiner—Gareth D. Shaw
Assistant Examiner—Gopal C. Ray
Attorney, Agent, or Firm—Antonelli, Terry, Stout & Kraus

[57] ABSTRACT

When the access is effected sequentially such as the prefetching of an instruction or the restoration of a register in the stack region, the retrieval is effected simultaneously for the consecutive addresses and the result is stored. When the consecutive addresses are to be accessed, the hit is determined relying upon the result that is stored without effecting the cache memory reference. In the case of mishit, the external memory is readily accessed to shorten the overhead time required for the cache memory reference. Therefore, the access time can be shortened in average.

12 Claims, 4 Drawing Sheets

MICROPROCESSOR WITH A CACHE MEMORY IN WHICH VALIDITY FLAGS FOR FIRST AND SECOND DATA AREAS ARE SIMULTANEOUSLY READABLE

BACKGROUND OF THE INVENTION

The present invention relates to a microprocessor, and more specifically to a cache memory adapted to operate at high speeds in a one-chip microprocessor in which the cache memory is mounted on a chip.

A cache memory has heretofore been extensively known as a high-speed memory that is to be installed between a central processing unit (CPU) and a main memory. The cache memory usually has a capacity smaller than that of the main memory and its high-speed characteristics lend itself well for operating a computer at an increased speed. That is, the data having a high frequency of access by the CPU are transferred in advance from the main memory to the cache memory, in order to shorten the memory access time by the CPU.

The cache memory system has been widely used ranging from general-purpose computers to mini-computers. For example, a 32-bit microprocessor MC68020 disclosed in The Motorola MC68020 IEEE, Micro, August, 1984, pp. 101-118 has a cache memory on the chip. In the cache memory, data consisting of 32 bits corresponds to an address memory.

According to the above prior art, however, the address must be retrieved every time when the data consisting of 32 bits is accessed in order to determine whether the data is present in the cache memory or not. Therefore, when an attempt is made to access an external memory without referring to the cache memory, the time required for the address retrieval increases the overhead.

Another prior art related to the cache memory has been taught in Japanese Patent Laid-Open No. 214039/1986, according to which a row of a cache memory is constituted by a data part which consists of an address data of an associative part and a plurality of words with an external data bus width as a unit, and a flag (valid flag) is provided to indicate whether the data stored in the word is effective or not for each of the words in the data part. Since a data part consisting of a plurality of words corresponds to an address data, the area of an associative part can be reduced in the cache memory per a word of data stored therein. By using the flag, furthermore, the corresponding data only is written in case of a mishit, without increasing the overhead.

SUMMARY OF THE INVENTION

The object of the present invention is to provide a microprocessor with a cache memory which is capable of reducing the overhead required for the cache memory reference for consecutive addresses at the time when the cache memory is sequentially accessed, that may happen when an instruction is prefetched or when a register that had been evacuated in the stack region is recovered.

In order to achieve the above object, the microprocessor with a cache memory of the present invention is constituted as described below. That is, the cache memory contained in the microprocessor is characterized by:

(1) the storing of a tag address consisting of a plurality of bits;

(2) stacking a plurality of rows in the column direction, each row being constituted by a plurality of data areas that will be accessed by commonly using data of a predetermined bit of said tag address, and any one of said plurality of data areas being selectively specified according to at least one remaining bit of said address data;

(3) an instruction execution block which executes the instruction based upon the data stored in said cache memory or in an external memory; and (4) a cache memory control circuit for controlling the operation of said cache memory;

wherein each of said plurality of data areas in said cache memory has a flag that indicates whether the data effective for the data area is stored or not, said cache memory control circuit has means for reading said flag and holding means for holding at least a portion of the flag data that is read out, and wherein when said plurality of consecutive data areas are to be sequentially accessed, said holding means holds the flag data of a data area other than the data area that is designated for the first time at the time of retrieving the data area that is selectively designated for the first time among the rows by said remaining bit signal, and whether the cache memory is hit or not is determined depending upon said flag data held in said holding means concerning those data areas of the rows that are selectively designated thereafter by other signals of said remaining bits.

At the time of retrieving the data areas other than the data area accessed for the first time, there is no need of sequentially effecting the cache memory reference, yet making it possible to immediately determine the hit or mishit relying upon the result that is held in the holding means. Therefore, the overhead time required for the cache memory reference can be shortened.

DESCRIPTION OF THE PREFERRED EMBODIMENT

Figure 1:
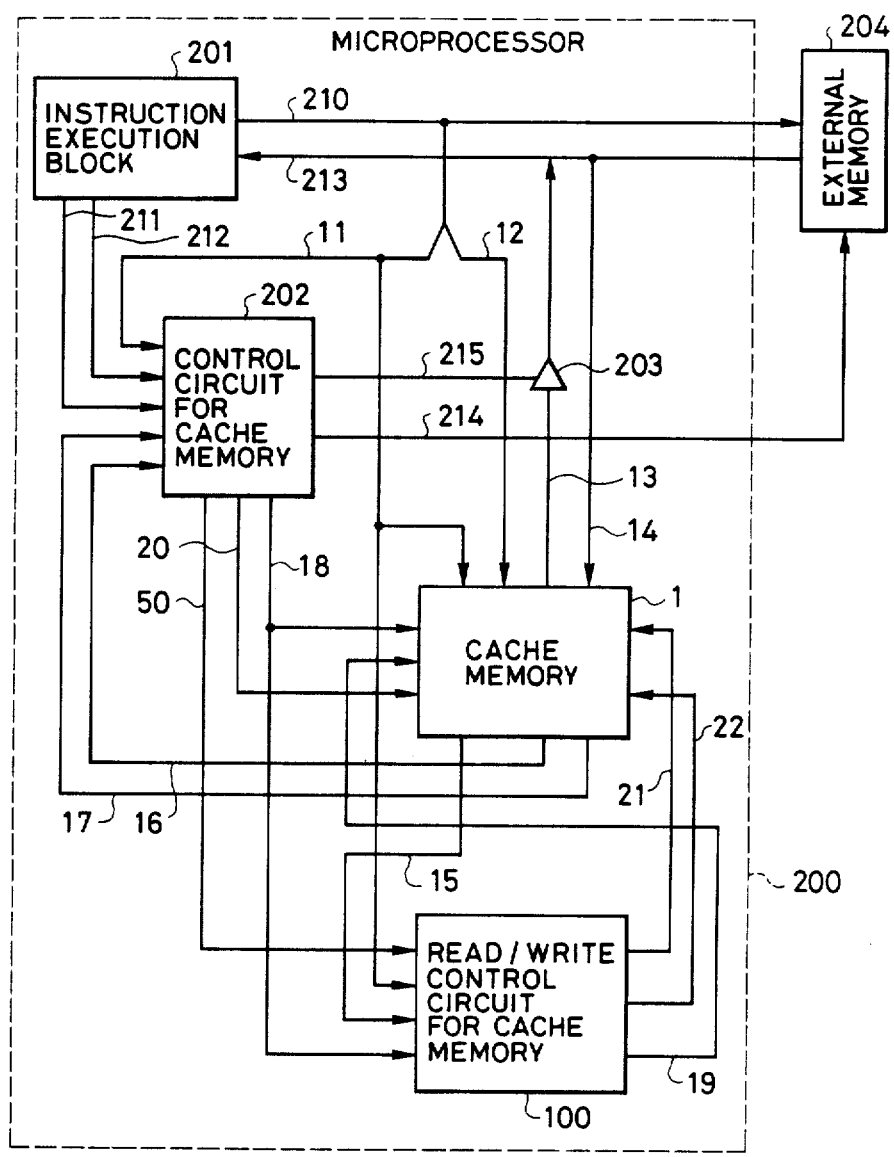
FIG. 1 is a diagram illustrating the structure of a microprocessor according to an embodiment of the present invention.

FIG. 1 is a diagram which illustrates the structure of a microprocessor according to an embodiment of the present invention.

A microprocessor 200 containing a cache memory 1 is capable of addressing the data of a memory in units of a byte, and has an address space of 32 bits, and transfers the data to the memory with 32 bits as a basic unit (word). To simplify the description, furthermore, the cache memory does not store the data but stores the instructions only.

The microprocessor 200 consists of an instruction execution block 201, a cache memory 1, a control circuit 202 for the cache memory, and a read/write control circuit 100 for the cache memory. Further, the microprocessor 200 is connected to an external memory 204, and executes a process using programs and data stored in the external memory.

Figure 2:
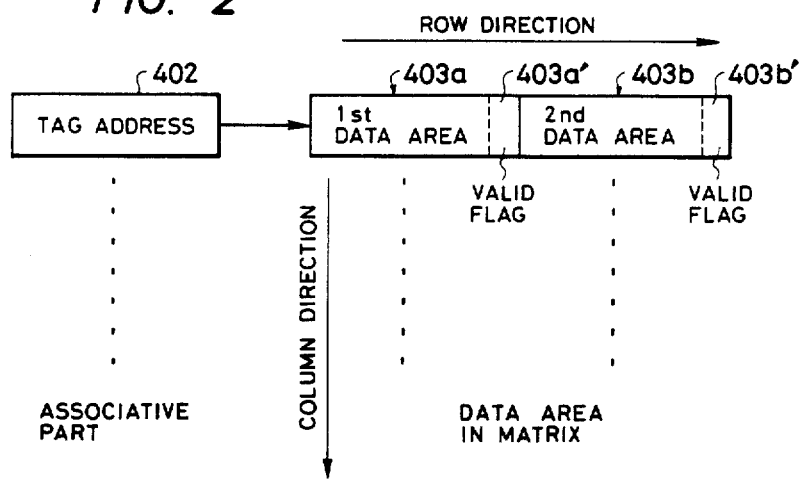
FIG. 2 is a diagram which schematically illustrates the interior of a cache memory shown in FIG. 1.

First, operation of the cache memory will be roughly described in conjunction with FIG. 2 which schematically illustrates the interior of the cache memory of FIG. 1.

Two data areas 403a and 403b having continuous word addresses correspond to a tag address 402 of an associative part, thereby to form a row. The thus formed rows are stacked in the direction of a column to form a cache memory in the form of a matrix.

Of the above two data areas, an even-number word address is assigned to a first data area 403a of the left side, and an odd-number word address is assigned to a second data area 403b of the right side. The two data areas are provided with valid flags 403' and 403b' that indicate whether effective data is stored or not.

The present invention exhibits its characteristic operation when the above continuous data areas are to be accessed. That is, when the first data area 403a is to be read out in response to the tag address, not only the flag 403a' of the area but also the flag 403b' of the second data area are read out and the data of the flag 403b' is stored in the holding means. The second data area has a large probability of being accessed following the first data area when the access is effected sequentially. Then, when the second data area 403b is to be read out, it is determined whether the cache memory is hit, or not relying upon the data of the flag 403b'.

Owing to the above-mentioned operation, whether the cache memory is hit or not is readily determined based upon the flag data that has been stored already in the holding means at the time when the second data area is being read out. Therefore, the access time can be shortened compared with when the flag of the second data area is newly read out at the time of reading the second data area. Determination of a hit based upon the flag data stored in the holding means will be explained later with reference to the cache memory control circuit.

The internal structure of each of the structural elements of FIG. 1 and the operation thereof will now be described.

Figure 3:
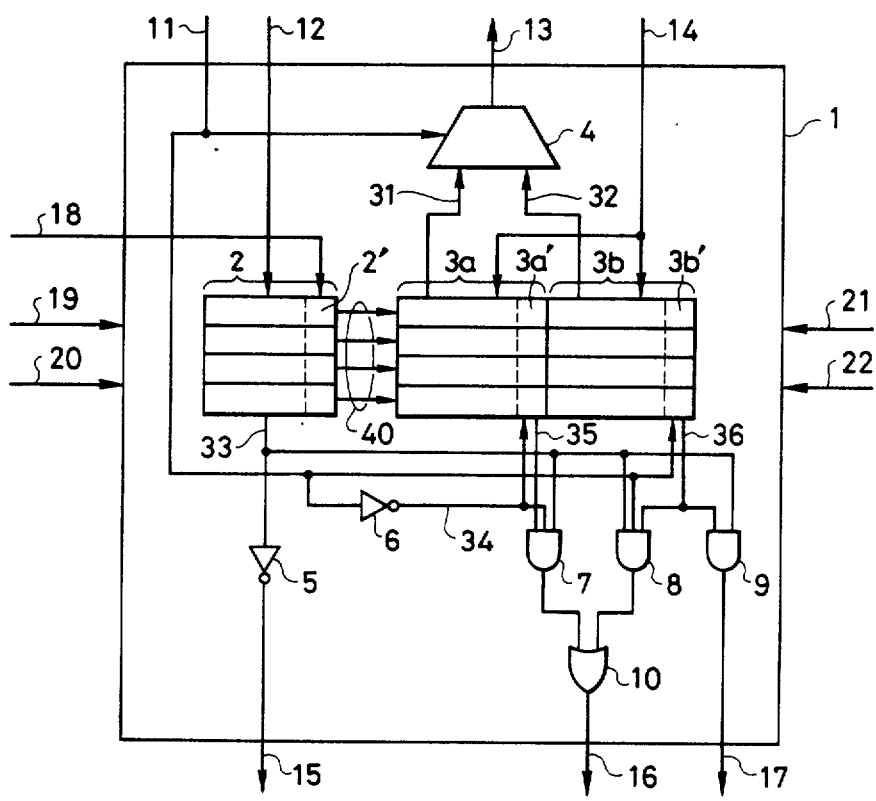
FIG. 3 is a diagram illustrating the internal structure of the cache memory shown in FIG. 1.

First, the structure of the cache memory 1 will be described in conjunction with FIG. 3.

The cache memory 1 chiefly consists of an associative memory 2, and RAM's 3a, 3b. Here, as mentioned with reference to FIG. 2, the two data areas (stored in 3a and 3b) having consecutive word addresses are related to an associated tag address in the associative memory 2. The data areas of the RAM's 3a and 3b are provided with flag portions (3a', 3b'). In this embodiment, furthermore, a flag portion 2' is provided even in the associative memory 2 to indicate that the address has been stored in an effective condition.

The cache memory 1 receives a signal 11 of the thirtieth bit (A2) and a signal 12 consisting of the upper 29 bits (A31 to A3) as an instruction fetch address among the address signals of 32 bits. The signal 11 indicates whether the instruction address is of an even number or an odd number. The signal 11 which is zero represents an address of an even number. The signal 11 which is 1 represents an address of an odd number. Further, a signal 14 consisting of 32 bits is input as an instruction input. Control signals 18, 19, 20, 21 and 22 are further input. The instruction consisting of 32 bits read from the cache memory is produced as a signal 13. The data related to the hit and mishit are formed based upon the signals from the flag portions 3a', 3b' of the data areas, and are produced as valid flag signals 15, 16 and 17. The valid flag signal 15 is produced when the cache memory reference indicates that no associated tag address is contained in the associative part 2. The valid flag signal 16 is produced when an effective instruction is stored in an instruction address during the access operation. The valid flag signal 17 is produced when there exists in an effective form in the RAM 36 an instruction of an odd-number instruction address that has a high probability of being accessed in the next time under the condition where an instruction address being accessed has an even number.

The associative memory 2 receives the signal 12 as an associative write input and receives the signal 18 as a valid flag. The associated result, i.e., hit/mishit is produced as a signal 33, and which row is hit is produced as a signal 40. The RAM's 3a and 3b are addressed by the signal 40, and signals 14, 34 and 11 are input thereto as write inputs. Signals 31, 32, 35 and 36 are produced as read outputs. The signal 31 is produced in response to the signal 14 input to the RAM 3a, the signal 35 is produced in response to the input signal 34, the signal 32 is produced in response to the signal 14 input to the RAM 36, and the signal 36 is produced in response to the input signal 11. The signals 31 and 32 input to the selector 4 are selected by the signal 11. When the signal 11 is zero, a value of the signal 31 is produced as the signal 13 and when the signal 11 is 1, a value of the signal 32 is produced as the signal 13. The signal 19 is a write designation signal of the associative memory 2, and the signal 20 is a row designation signal that is to be written. The signal 21 is a write designation signal of RAM 3a, and the signal 22 is a write designation signal of RAM 3b.

The associative memory 2 stores associative data consisting of 29 bits and a valid flag consisting of one bit. Depending upon the write designation signal 19, the associative memory 2 operates as described below. When the signal 19 is "0", the signal 12 is compared with the associated address stored in each of the rows. When there is found a row that is in agreement and when the valid flag 2' of that row is 1 (i.e., when there exists a corresponding address is an effective form), the signal 33 is rendered to be "1" and the line of the signal 40 corresponding to the row is rendered to be "1". The valid flag signal "0" taken from an inverter 5 indicates that an associated effective tag address is contained in the associative part 2. Next, when the signal 19 is "1", a value of the signal 12 as an associated tag address and a value of the signal 18 as a valid flag are written onto the row that is specified by the signal 20.

The RAM's 3a and 3b, respectively, hold instructions of an even-number word address and an odd-number word address. The cache memory 1 further comprises inverters 5 and 6, AND gates 7, 8 and 9, and an OR gate 10.

Figure 4:
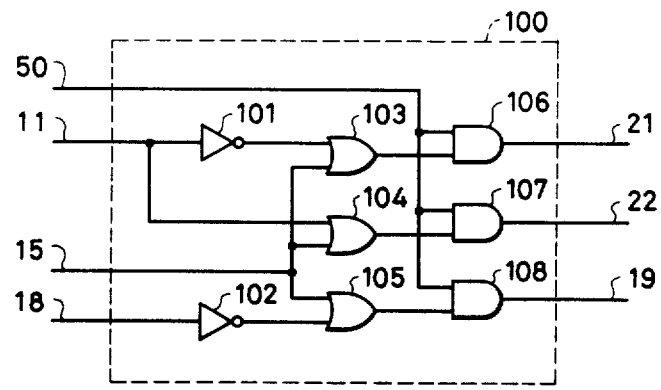
FIG. 4 is a diagram illustrating the internal structure of a read/write control circuit for cache memory of FIG. 1.

Reading operation of the cache memory 1 is carried out as described below under the control of the read/write control circuit 100 for cache memory that is shown in FIG. 1. FIG. 4 shows an example of the read/write control circuit for cache memory. A write signal 50 is rendered to be "0", and an address of a read instruction is input to the cache memory 1 in the form of the aforementioned signals 11 and 12. Since the write signal 50 is "0", signals 19, 21 and 22, too, assume the level "0" to designate the reading of data from the associative memory 2 and from the RAM's 3a, 3b through AND gates 106, 107 and 108 of the write control circuit. Since the signal 19 is "0", the associative memory 2 performs the association with a signal 12, and the result is produced as signals 33 and 40.

The characteristic reading operation of the present invention is carried out by the cache memory control circuit 202 in a manner as described below.

Figure 5:
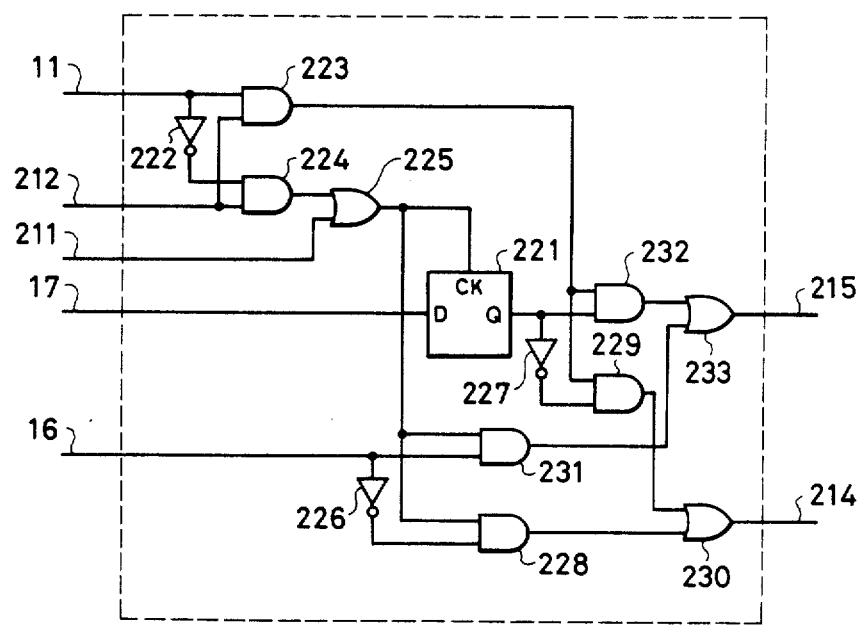
FIG. 5 is a diagram illustrating the internal structure of a portion of the cache memory control circuit of FIG. 1.

FIG. 5 illustrates the structure of the instruction cache control circuit 202 which commences its operation upon receipt of a branch request signal 211 or a prefetch request signal 212 sent from the instruction execution block 201. The branch request signal 211 is input from the instruction execution block to the instruction cache control circuit when a branch is generated in the flow of a program, and the prefetch request signal 212 is input from the instruction execution block to the instruction cache control circuit when there is generated no branch but when the program is to be executed sequentially.

First, when the instruction execution block 201 requests the branch (signal 211 is "1" and signal 212 is "0"), and when the prefetch is requested and the instruction address has an even number (signal 211 is "0", signal 212 is "1", and signal 11 is "0"), an OR gate 225 produces an output "1" due to inverter 222, AND gates 223 and 224, and OR gate 225. Therefore, when the valid flag signal 16 is "1" (or is stored) that indicates that an effective instruction is stored in an instruction address during the access operation, an AND gate 231 produces an output "1" and whereby a cache memory access request signal 215 is produced via an OR gate 233. When the valid flag signal on line 16 is "0" (not stored), on the other hand, an external memory access request signal 214 is produced via inverter 226, AND gate 228, and OR gate 230.

At this moment, the output of the OR gate 225 is also input to a clock input CK of a D flip-flop (D-FF) 221. To the D-input of the D-FF is input a valid flag signal 17 that indicates that an instruction of an odd-number address having a high probability of being accessed next is present in an effective form in the RAM 3b when the instruction address being accessed is an even-number address. That is, while the even-number address is being accessed, existence of data on the side of an odd-number address is input as a valid flag signal 17 to the D-input of the D-FF 221.

When the instruction execution block 201 produces a prefetch request and when the instruction address is changed from the previous even-number condition to an odd-number condition (signal 211 becomes "0", signal 212 becomes "1", and signal 11 becomes "1"), the instruction cache control circuit 202 fabricated with the D-FF 221 as a counter exhibits its operation which is characteristic to the present invention. First, as the signal 11 becomes "1", the OR gate 225 applies a signal "0" to the clock input CK of the D-FF 221. The data of valid flag signal 17 is produced from the output Q of D-FF at a timing of the change of clock input. When the valid flag signal 17 is "1" (an instruction exists in an odd-number address), the output Q becomes "1" and a cache memory access request signal 215 is produced via an AND gate 232 and an OR gate 233. On the other hand, when the valid flag signal 17 is "0" (no instruction exists in the odd-number address), the output Q becomes "0", and an external memory access request signal 214 is produced via inverter 227, AND gate 229 and OR gate 230.

Figure 6:
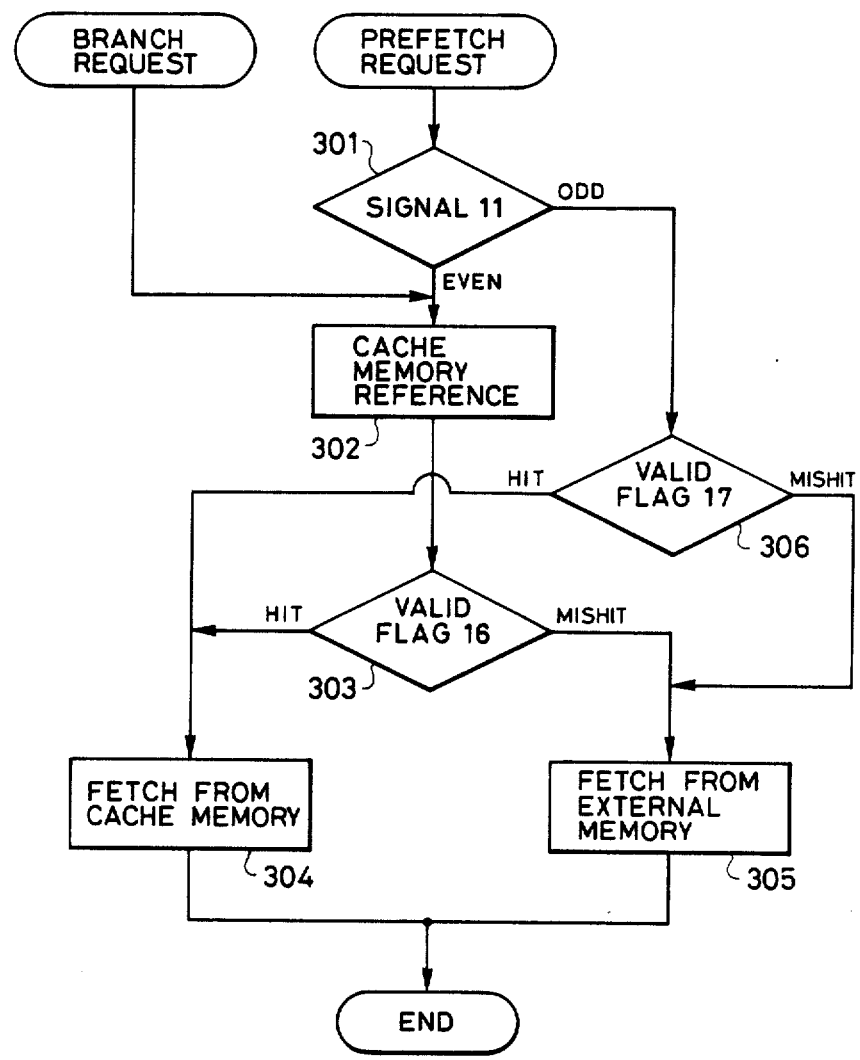
FIG. 6 is a flow chart which illustrates the operation of the cache memory control circuit of FIG. 1.

FIG. 6 is a flow chart that illustrates the above-mentioned operation. When the branch request signal 211 is "1", the instruction execution block commences the program from a step 302. When the instruction prefetch request signal 212 is "1", the instruction execution block commences the program from a step 301 where it is examined whether the instruction address has an odd number or an even number. When the instruction address has an even number, the program proceeds to a step 302 and when the instruction address has an odd number, the program proceeds to a step 306. Here, the instruction address (word address) having an even number indicates that access is made to a data area that is to be accessed at first among a plurality of data areas (two areas in this case) for a tag address of the associative part. When the instruction address has an odd number, on the other hand, it means that access is made to other data areas. In the next step 302, the cache memory 1 performs the associative operation, i.e., cache memory reference. As will be comprehended from the flow chart, the step 302 is carried out (1) when the instruction execution block 201 is producing the branch request signal 211, and (2) when the instruction execution block 201 is producing the prefetch request signal 212 and when the instruction address has an even number (i.e., when access is made to a data area that is to be accessed at first).

When it is confirmed (hit) in a step 303 using a valid flag 16 that an instruction to be accessed exists in the cache memory 1, the program proceeds to a step 304. When it does not exist (mishit), on the other hand, the program proceeds to a step 305. In the step 304, the instruction is read from the cache memory 1, the signal 215 is asserted, and the instruction 13 that is read out is sent onto a data bus 213 via a tri-state buffer 203. The step 305 asserts the external memory access request signal 214, reads an instruction from the external memory 204 and sends it onto the data bus 213. The instruction sent onto the data bus 213 in the above steps 304 and 305, is received by the instruction execution block 201 and is executed.

When the instruction address has an odd number in the step 301, the program proceeds to the step 306 which forms a characteristic portion of the present invention and which is carried out when the instruction execution block 201 is producing a prefetch request signal 212 and when the instruction address has an odd number (i.e., when access is made to data areas other than the data area that is to be accessed at first). The program proceeds to the step 304 when it is confirmed (hit) in the step 306 using the valid flag 17 that an instruction that is to be accessed exists in the cache memory 1. That is, the ordinary cache memory reference is not effected in the step 306 but is effected in the preceding step 302 of addressing an even-number instruction, and wherein the hit or mishit is determined using the data of the valid flag 17 that is stored.

In the foregoing was described the operation at the time of prefetching the instruction. It will, however, be obvious that the present invention can be adapted even when the register that had been evacuated in the stack region is restored.

In the embodiments, furthermore, the number of words (number of data areas) of the RAM corresponding to the associative part was set to be 2. It will, however, be obvious that the present invention can be easily expanded to cover the number of words (number of data areas) which is an exponential power of 2.

We claim:

1. A microprocessor comprising:
(a) an instruction execution block for executing instructions using data stored in a cache memory or in an external memory;
(b) a cache memory coupled to said instruction execution block and including at least first and second data in areas which are commonly accessed by an upper bit signal of an instruction fetch address generated from said instruction execution block, the respective first and second data areas in said cache memory being selectively specified by a lower bit signal of said instruction fetch address, and wherein each area of said first and second data areas in said cache memory includes data and a flag associated with the data which indicates whether or not said data is valid;
(c) first means for reading out a flag in said second data area when a flag in a commonly accessed first data area is read out in response to said upper bit signal and a lower bit signal of an instruction fetch address which specifies said first data area;
(d) second means coupled to said first means for latching information related to a flag of said second data area when a flag of said second data area is read out by said first means; and
(e) third means for reading out said information from said second means in response to a lower bit signal of said instruction fetch address which specifies said second data area when said second data area is consecutively accessed after said first data area is accessed.

2. A microprocessor comprising:
(a) an instruction execution block for executing instructions using data stored in a cache memory or in an external memory;
(b) a cache memory coupled to said instruction execution block and including at least first and second data areas which are commonly accessed by an upper bit signal of an instruction fetch address generated from said instruction execution block, the respective first and second data areas in said cache memory being selectively specified by a lower bit signal of said instruction fetch address, and wherein each area of said first and second data areas in said cache memory includes data and a flag associated with the data which indicates whether or not said data is valid;
(c) first means for reading out a flag in said second data area when a flag in a commonly accessed first data area is read out in response to said upper bit signal and said lower bit signal of said instruction fetch address;
(d) second means coupled to said first means for holding information related to said flag of said second data area read out by said first means; and
(e) third means for reading out said information from said second means in response to said lower bit signal of said instruction fetch address when said second data area is consecutively accessed after said first data area is accessed, wherein said cache memory includes:
a first stack of a plurality of rows of storage areas arranged in a column direction, each row including a first data area and a second data area; and
a second stack of a plurality of rows of storage areas arranged in a column direction, each row of said second stack storing address information corresponding to data stored in said first and second data areas in a corresponding row of said first stack.

3. A microprocessor according to claim 2, wherein said cache memory further includes means for comparing said upper bit signal of said instruction fetch address with said address information stored in said plurality of rows of said second stack, and means for selecting one of said plurality of rows in said first stack in accordance with a detected coincidence between said upper bit signal with said address information by said comparing means to read out the data stored in said first and second data areas in said selected row.

4. A microprocessor comprising:
(a) an instruction execution block for executing instructions using data stored in a cache memory or in an external memory;
(b) a cache memory coupled to said instruction execution block and including at least first and second data areas which are commonly accessed by an upper bit signal of an instruction fetch address generated from said instruction execution block, the respective first and second data areas in said cache memory being selectively specified by a lower bit signal of said instruction fetch address, and wherein each area of said first and second data areas in said cache memory includes data and a flag associated with the data which indicates whether or not said data is valid;
(c) first means for reading out a flag in said second data area when a flag in a commonly accessed first data area is read out in response to said upper bit signal and said lower bit signal of said instruction fetch address;
(d) second means coupled to said first means for holding information related to said flag of said second data area read out by said first means; and
(e) third means for reading out said information from said second means in response to said lower bit signal of said instruction fetch address when said second data area is consecutively accessed after said first data area is accessed, wherein said third means includes means for producing signals related to a cache hit or a cache mis-hit on the basis of flags read out of said first and second data areas.

5. A microprocessor comprising:
(a) an instruction execution block for executing instructions using data stored in a cache memory or in an external memory, including means for generating a request signal for the accessing of data stored in consecutive storage locations of said cache memory or said external memory;
(b) a cache memory coupled to said instruction execution block and including at least first and second data areas which are commonly accessed by an upper bit signal of an instruction fetch address generated from said instruction execution block, the respective first and second data areas being selectively specified by respective first and second values of a lower bit signal of said instruction fetch address, and wherein each area of said first and second data areas includes data and a flag associated with the data which indicates whether or not said data is valid;
(c) first means responsive to said upper bit signal and said first value of said lower bit signal of said instruction fetch address for simultaneously reading out the flags in said first data area and said second data area of said cache memory;

(d) second means coupled to said first means and responsive to said request signal from said instruction execution block and said first value of said lower bit signal of said instruction fetch address for holding information related to said flag of said second data area read out by said first means;

(e) third means responsive to said flag of said first data area read out by said first means and said request signal from said instruction execution block for generating a cache hit or a cache mis-hit signal for said data in said first data area; and (f) fourth means responsive to said information held in said second means, said request signal from said instruction execution block and said second value of said lower bit signal of said instruction fetch address for generating a cache hit or cache mis-hit signal for said data in said second data area.

6. A microprocessor according to claim 5, wherein said cache memory includes:
a first stack of a plurality of rows of storage areas arranged in a column direction, each row including a first data area and a second data area; and
a second stack of a plurality of rows of storage areas arranged in a column direction, each row of said second stack storing address information corresponding to data stored in said first and second data areas in a corresponding row of said first stack.

7. A microprocessor according to claim 6, wherein said cache memory further includes means for comparing said upper bit signal of said instruction fetch address with said address information stored in said plurality of rows of said second stack, and means for selecting one of said plurality of rows in said first stack in accordance with a detected coincidence between said upper bit signal with said address information by said comparing means to read out the data stored in said first and second data areas in said selected row.

8. A microprocessor according to claim 7, further including selector means, responsive to a cache hit signal from said third means and said first value of said lower bit signal, for applying data read out of a first data area to said instruction execution block, and responsive to a cache hit signal from said fourth means and said second value of said lower bit signal, for applying data read out of a second data area to said instruction execution block.

9. A microprocessor comprising:
(a) an instruction execution block for executing instructions using data stored in a cache memory or in an external memory, said cache memory being coupled to said instruction execution block and including at least first and second data areas, an upper bit signal of an instruction fetch address generated from said instruction execution block accessing commonly said first and second data areas, the respective first and second data areas in said cache memory being selectively specified by a lower bit signal of said instruction fetch address, and each area of said first and second data areas in said cache memory including data and a flag associated with said data indicates whether or not said data is valid;

(b) first means for reading out the flag in said second data area when the flag in said first data area is read out in response to said upper bit signal and said lower bit signal of said instruction fetch address;

(c) second means for holding information related to said flag of said second data read out by said first means; and (d) third means for reading out said information from said second means in response to said lower bit signal of said instruction fetch address when said second data area is consecutively accessed after said first data area is accessed, said third means including means for inhibiting the reading out operation of said information from said second means in response to a branch request signal.

10. A microprocessor according to claim 9, wherein said cache memory includes:
a first stack of a plurality of rows of storage areas arranged in a column direction, each row including said first data area and said second data area; and
a second stack of a plurality of rows of storage areas arranged in a column direction, each row of said second stack storing address information corresponding to data stored in said first and second data areas in a corresponding row of said first stack.

11. A microprocessor according to claim 10, wherein said cache memory further includes means for comparing said upper bit signal of said instruction fetch address with said address information stored in said plurality of rows of said second stack, and means for selecting one of said plurality of rows in said first stack in accordance with a detected comparison of said upper bit signal with said address information by said comparing means to read out the data stored in said first and second data areas in said selected row.

12. A microprocessor according to claim 9, wherein said third means includes means for producing signals related to a cache hit or a cache mis-hit on the basis of flags read out of said first and second data areas.

* * * * *